United States Patent [19]

Cooper

[11] Patent Number: 5,675,930
[45] Date of Patent: Oct. 14, 1997

[54] METHOD, APPARATUS AND SYSTEM FOR MARKING AND CREATING LANDSCAPE BORDERS

[76] Inventor: James White Cooper, P.O. Box 210645, Nashville, Tenn. 37221

[21] Appl. No.: 610,973

[22] Filed: Mar. 1, 1996

Related U.S. Application Data

[63] Continuation of Ser. No. 189,726, May 16, 1994, abandoned.

[51] Int. Cl.$^6$ .................................................. A01G 1/00
[52] U.S. Cl. ........................ 47/33; 52/102; 52/233; 404/7
[58] Field of Search ...................... 47/33; 404/7, 8; 52/102, 233, 28, 220.7, 220.8

[56] References Cited

U.S. PATENT DOCUMENTS

| | | | |
|---|---|---|---|
| 352,146 | 11/1886 | Oungst | 47/33 |
| 2,920,184 | 1/1960 | Kessler | 404/7 |
| 3,491,660 | 1/1970 | Kwasney | 47/33 |
| 4,391,077 | 7/1983 | Giess | 52/233 |
| 4,463,532 | 8/1984 | Faw | 52/233 |
| 4,905,409 | 3/1990 | Cole | 52/233 |
| 4,945,675 | 8/1990 | Kendrick | 47/33 |
| 5,119,587 | 6/1992 | Waltz | 52/102 |
| 5,253,458 | 10/1993 | Christian | 52/233 |
| 5,259,154 | 11/1993 | Lilley | 52/102 |
| 5,283,994 | 2/1994 | Callison | 47/33 |

FOREIGN PATENT DOCUMENTS

| | | | |
|---|---|---|---|
| 462343 | 10/1951 | Italy | 404/7 |
| 426535 | 4/1935 | United Kingdom | 52/233 |
| 483342 | 4/1938 | United Kingdom | 404/9 |

*Primary Examiner*—Terry Lee Melius
*Assistant Examiner*—Joanne C. Downs
*Attorney, Agent, or Firm*—Wascher & Thomas; Rick R. Wascher; Laura R. Thomas

[57] ABSTRACT

The present invention is directed to an apparatus and method for defining a landscape boundary. The invention comprises a longitudinal log having spaced apart ends, one of which is pronged and the other is flanged. The pronged and flanged ends are configured so as to engage one another by virtue of a pivot pin or locking pin arrangement. In this fashion, several logs can be fastened together and arranged in a variety of curved paths if necessary so as to define a landscape boundary. The invention also includes a lighting element to provide illumination to the landscape where the invention is used. The method of the present invention is directed to the steps of constructing a landscape boundary incorporating the apparatus of the present invention.

14 Claims, 1 Drawing Sheet

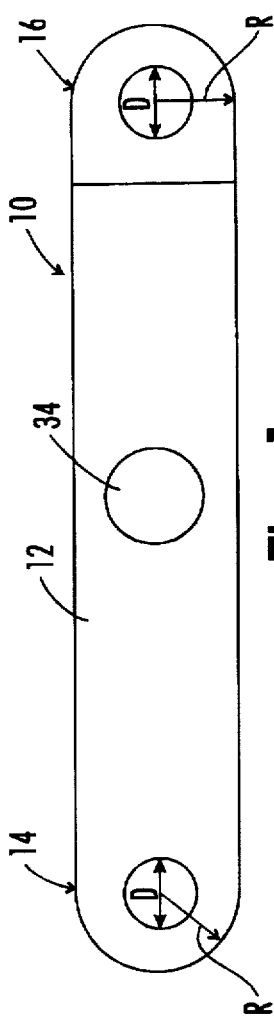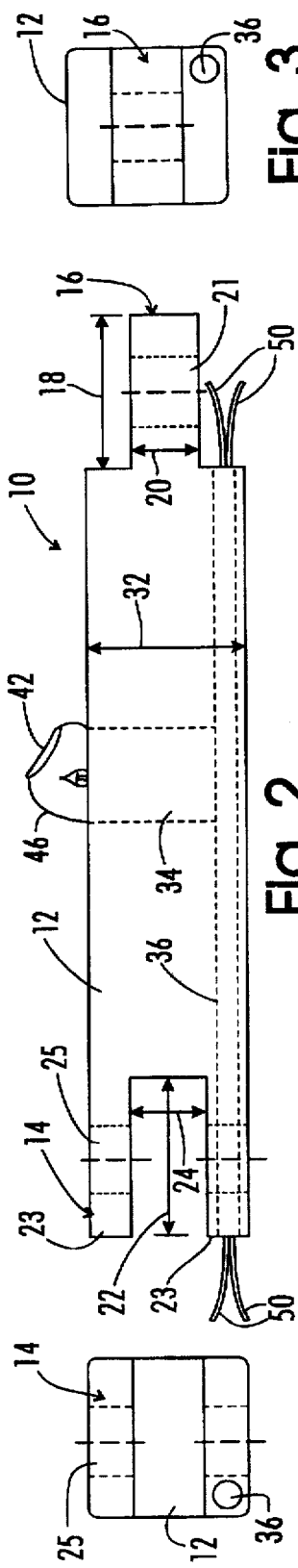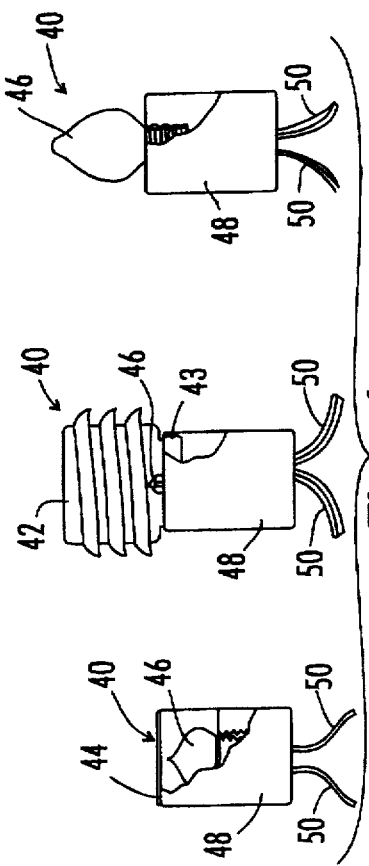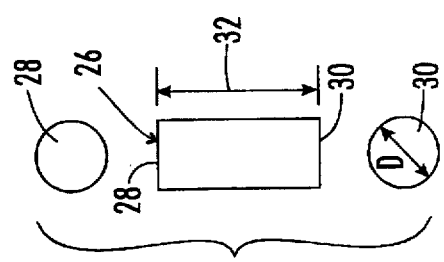

METHOD, APPARATUS AND SYSTEM FOR MARKING AND CREATING LANDSCAPE BORDERS

This is a continuation of application Ser. No. 08/189,726 filed on May 16, 1994, now abandoned.

BACKGROUND OF THE INVENTION

1. Field of the Related Art

The present invention relates generally to methods and apparatuses for creating or making edges and other defined boundaries for landscapes, but more particularly to such methods, apparatuses and systems incorporating polymeric building elements or blocks to form the aforementioned boundary.

2. Description of the Related Art

The art to which the invention relates includes landscaping beams or blocks sometimes referred to as logs. Landscaping logs are used to build boundaries such as edgings around flower beds, trees, walkways, and other natural and artificial structure. Wood landscaping logs are typically several feet in length, rigid, and not particularly well-suited for creating or making curved landscape boundaries.

U.S. Pat. No. 5,119,587 granted to Waltz, incorporated by reference as if fully set forth herein, is directed to a method and apparatus for landscape edging. The Waltz apparatus, and therefore the method of using the apparatus, is a specially constructed block or brick having curved ends. The apparatus may be utilized to conform to regular or unusual terrain boundaries. One portion of each block is curved in a convex manner and another portion is curved in a concave manner. The curved ends may be in one plane or in more than one plane with overlapping and underlapping ends being curved appropriately. Appropriate scoring or marking is provided to break blocks intermediate therein to form a square and to a particular edging design if desired. Pegs or stakes are provided to match the holes in portions of the blocks.

One drawback associated with the Waltz apparatus is the possibility for the bricks or blocks to become uncoupled. The uncoupling occurs because the bricks essentially overlie one another in a specific fashion and the pin is used as the point of articulation. One block is not constrained within the confines of the body of another block. The blocks may become separated through natural wear and tear, or through contact with humans, pets, and landscaping equipment such as lawn mowers.

U.S. Pat. No. 4,945,675, granted to Kendrick and incorporated by reference as if fully set forth herein, is directed to a dividing, watering and lighting system for lawns which uses straight and curved sections containing integral water and electrical wiring conduits. The ends include fittings to interconnect the sections to form a continuous divider. Sprinkler heads are disposed along the divider and connected internally along the divider. Lighting fixtures are installed along the divider and internally connected to wiring in the wiring conduits.

One drawback associated with the Kendrick apparatus is that it requires the use of multiple divider configurations to accommodate the variety of positions and angular orientations of different landscaping arrangements. Moreover, the Kendrick apparatus does not provide for pivotal interconnection of adjacent divider sections to enable the user to orient the sections in a variety of configurations. Rather, adjacent segments of the Kendrick apparatus are connected only by the water and electrical conduits.

British Patent No. 426,535, granted to Turczan and incorporated by reference as if fully set forth herein, is directed to wooden wall construction system incorporating blocks of various configurations which are designed to fit together to form a watertight wall. The wood blocks of the British patent have three different end configurations. Mating ends of the different block configurations may be connected; however, identically configured blocks are not capable of interconnection.

Similar to the Kendrick apparatus, adjacent interconnected blocks of the Turczan system are not capable of pivotal rotation with respect to one another. The squared ends of the blocks are configured to permit a fight cooperating fit between adjacent blocks, thus preventing pivotal movement therebetween. Although adjacent blocks are connected by a pin, the blocks are not capable of pivotal movement about the connecting point because the squared ends restrict movement between adjacent blocks. Accordingly, adjacent interconnected blocks may only be positioned end-to-end in a 180° orientation relative to one another or perpendicularly in a 90° orientation relative to one another.

Until now, it is believed that a system useful for landscaping various boundaries around shrubs, trees, walkways and the like incorporating interconnecting block members capable of resisting disconnection by virtue of their interlocking feature such that one block is interconnected within the structural confines and boundary of an adjacent block, as well as having light fixtures incorporated therein, has not been invented.

SUMMARY OF THE INVENTION

The present invention is directed to a weather resistant apparatus, system and method for creating or marking landscape boundaries. The inventive apparatus includes a log having a body constructed of a synthetic material wherein the body includes a flanged end, a pronged end having spaced apart prongs, and a central portion therebetween.

The synthetic material can be plastic, rubber, polymers or any suitable combination of materials having high strength and durability characteristics and resistance to the outdoor elements. For example, the apparatus can be manufactured from recycled plastic milk jugs.

The flange and prongs of each log of the present invention are arcuate or curved in a convex manner to enable the pivotal movement of adjacent logs with respect to one another. Accordingly, interconnected logs can be rotated through a range of angular orientations to accommodate virtually any landscape geometry.

A pin receiving bore extends transversely through the prongs of the pronged end and the flanged end. A pin member configured for engagement with the bore of either of the pronged end and the flanged end is insertable into the bores to provide pivotal attachment between two of the logs. The pin member may be a stake for anchoring the beam body to the landscape.

An optional light means is attached to the body for providing illumination of the landscaping. The light means includes a socket, a bulb, and electrical leads, and an optional lens. The light means is received by a light means receptacle formed in the log body. The receptacle includes a bore for receiving a socket and an interconnecting channel for receiving electrical leads. Of course, the light means may also include the structure corresponding to the socket, bulb, electrical leads, as well as the channel and receptacle of the log body.

3

The system of the present invention incorporates at least two beams constructed in the manner described herein and its equivalents, and by way of example, includes the method of interconnection and illumination as set forth in accordance with the method of the present invention.

The method includes the steps of providing at least two logs wherein each log has a body constructed substantially identical to any other as described above. The flanged end of a log is preferably positioned and attached between and to the prongs of the pronged end of another log.

The method also includes inserting a pin through the axially aligned bore extending transversely through each of the spaced apart ends for pivotal attachment of adjacent logs. The log configuration is then placed around a landscape boundary and the light means is illuminated.

BRIEF DESCRIPTION OF THE DRAWINGS

FIG. 1 is a top view of an embodiment of the present invention;

FIG. 2 is a side view of the embodiment of the present invention shown in FIG. 1;

FIGS. 3 and 4 are end views of the embodiment of the present invention in FIGS. 1 and 2;

FIG. 5 is a top, side and bottom view of the pin component used in conjunction with the embodiment of the present invention shown in FIGS. 1 through 4; and FIG. 6 is a side perspective view of the light elements illustrated in FIG. 2 and used in conjunction with the embodiment of the present invention shown in FIG. 2.

DETAILED DESCRIPTION OF THE PREFERRED EMBODIMENT(S)

An embodiment of the present invention is designated generally by the reference numeral 10. Embodiment 10 incorporates a longitudinal body of a synthetic material such as plastic, rubber or other suitable material capable of resisting outdoor elements. The body is comprised of a central portion 12, a pronged end 14 opposite a flanged end 16.

With respect to flanged end 16, as shown in FIGS. 1, 2, and 4, flange 16 protrudes a distance 18 from the central body portion 12. The flange portion 16 has a height 20 which is preferably aligned along the central axis of the central portion 12. The flange portion 16 is arcuate or curved in a convex manner such that a radius R extends from a centroid or point of origin to enable unrestricted pivotal movement of adjacent connected logs with respect to one another. Bore 21 having a diameter D is drilled through the flange 16 a portion of which, in the preferred embodiment, follows radius R.

With reference to FIGS. 1, 2, and 4, pronged end 14 has a pair of spaced apart prongs 23 having a length 22 and a separation distance 24. Bore 25 extends through both prongs and has a diameter D. The outer edge of the prong members 23 follow radius R.

With reference to FIG. 5, pin member 26 has spaced apart ends 28 and 30, and length 32. The cross-section of the pin member, in the preferred embodiment, has a diameter D substantially corresponding to the diameter D of bores 21 and 25. In use, a pair of identically configured logs 10 can be fastened together by inserting the flange 16 having a width 20 into the space having a width 24 such that bores 21 and 25 align and pin member 26 can be inserted therethrough to provide a pivot and to constrain the flange of one log within the confines of the structural boundary of a second log.

4

With reference to the central section 12 of an embodiment of the invention 10, a centrally located fixture receptacle 34 is formed therein. Longitudinal channel 36 communicates with the central receptacle 34, the importance of which will be described hereinbelow.

With reference to FIGS. 2 and 6, light assembly 40 is designed to occupy the central receptacle 34. In one embodiment of the light assembly 40, a bulb cover 42 having threads 43, or with respect to another embodiment cover 44, shields bulb 46 and is attached to the socket 48 having leads 50. Of course, the bulb 46 can be exposed from the socket 48.

When the socket 48 is inserted into the receptacle 34, the leads 50 are threaded through the central channel 36 so as to provide a stable combination of landscaping log 10 and illuminatable element 40 to increase the aesthetics and to functionally light up walkways, and other obstacles associated with landscape.

These and other embodiments of the present invention shall become apparent after consideration of the specification provided herein, whose only limitation is the scope of the appended claims.

What is claimed is:

1. A weather resistant apparatus for marking landscape boundaries, comprising:

a log having a body constructed of a synthetic material wherein the body includes a ranged end having a flange, a pronged end having spaced apart prongs, and a central portion therebetween;

wherein the flange and the prongs are positioned in parallel planes relative to one another and are sized to allow the flange of a first log to be inserted between the spaced apart prongs of a second log;

wherein the flanged end and the pronged end are convex to enable pivotal movement of a first log through a range of angular orientations with respect to a second log;

a pin receiving bore extending transversely through the prongs of the pronged end and the flanged end; and a pin member configured for engagement with the bore of either of the pronged end and the flanged end to pivotally attach a first log to a second log at the junction of the flange of a first log interpositioned between the spaced apart prongs of a second log.

2. The apparatus of claim 1 wherein the body further includes a receptacle for a light means attached to the body for providing illumination of the landscape.

3. The apparatus of claim 2 wherein the receptacle includes a bore for receiving a socket and a channel that communicates with the bore.

4. The apparatus of claim 3 wherein the light means includes a socket, a bulb, and electrical leads.

5. The apparatus of claim 1 wherein the pin member is a stake for anchoring the log body to the landscape.

6. The apparatus of claim 4 further including lens means for covering the bulb.

7. A weather resistant interconnecting log system, constructed of a synthetic material, for marking a landscape boundary, comprising:

a plurality of logs wherein each log has a body constructed substantially identical to any other and each body has a flanged end having a flange opposite a pronged end having spaced apart prongs;

wherein the flange and the spaced apart prongs are positioned in parallel planes relative to one another such that the flanged end of a first log of the plurality of logs is received by the pronged end of a second log of the plurality of logs;

wherein the flanged end and the pronged end are arcuate such that a radius extends from a point of origin to enable the first log to rotate through a range of angular orientations with respect to the second log;

a bore extending transversely through each of the spaced apart prongs and the flange; and pin means for insertion into the bore to pivotally attach the first log and the second log together.

8. The log system of claim 7 including light means attached to the body of at least one log for providing illumination of the landscape boundary.

9. The log system of claim 8 wherein the body of at least one log includes a receptacle for the light means.

10. The log system of claim 9 wherein the receptacle includes a bore for receiving a socket and an interconnecting channel for receiving electrical leads.

11. The log system of claim 8 wherein the light means includes a socket, a bulb, and electrical leads.

12. The log system of claim 7 wherein the pin means is a stake for anchoring each log body to the landscape.

13. A method of illuminating a landscape, comprising the steps of:

providing at least two logs wherein each log has a body constructed substantially identical to any other wherein each body has a convex flanged end, having a radius, having a flange spaced apart from a convex pronged end, having spaced apart prongs having radii, a bore extending transversely through each of the convex flanged and convex pronged ends, a light means attached to the body of at least one log for providing illumination of the landscape, and wherein the flange and the prongs are positioned in parallel planes relative to one another;

positioning the flanged end of a log of the at least two logs between the prongs of the pronged end of another log of the at least two logs;

attaching the at least two logs together such that the flanged end of a log is pivotally attached to and between the prongs of another log;

positioning the at least two logs adjacent a portion of landscape to be illuminated, and illuminating the light means.

14. The method of claim 13 wherein the body of the at least two logs includes an axially aligned bore extending transversely through each of the convex flanged and convex pronged ends and the attaching step further includes inserting a pin through the axially aligned bore for pivotal attachment of the logs.

* * * * *